(12) United States Patent
Roithinger et al.

(10) Patent No.: US 12,318,875 B2
(45) Date of Patent: Jun. 3, 2025

(54) METHOD FOR DETERMINING AN ESTIMATED VALUE OF AN ARC VOLTAGE

(71) Applicant: Fronius International GmbH, Pettenbach (AT)

(72) Inventors: Philipp Roithinger, Wels-Thalheim (AT); Helmut Ennsbrunner, Wels-Thalheim (AT); Dominik Söllinger, Wels-Thalheim (AT); Gebhard Wallinger, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 237 days.

(21) Appl. No.: 18/038,591

(22) PCT Filed: Nov. 23, 2021

(86) PCT No.: PCT/EP2021/082632
§ 371 (c)(1),
(2) Date: May 24, 2023

(87) PCT Pub. No.: WO2022/112225
PCT Pub. Date: Jun. 2, 2022

(65) Prior Publication Data
US 2024/0001472 A1    Jan. 4, 2024

(30) Foreign Application Priority Data
Nov. 25, 2020  (EP) .................................... 20209769

(51) Int. Cl.
*B23K 9/095*     (2006.01)
*B23K 31/12*     (2006.01)

(52) U.S. Cl.
CPC .......... *B23K 9/0953* (2013.01); *B23K 31/125* (2013.01)

(58) Field of Classification Search
CPC .... B23K 9/095; B23K 9/0953; B23K 31/125; B23K 11/25; B23K 11/251; B23K 11/258
See application file for complete search history.

(56) References Cited

U.S. PATENT DOCUMENTS

| | | | |
|---|---|---|---|
| 6,710,297 B1 | 3/2004 | Artelsmair et al. | |
| 2005/0269297 A1* | 12/2005 | Buda ................... | B23K 11/257 219/110 |

(Continued)

FOREIGN PATENT DOCUMENTS

| | | |
|---|---|---|
| DE | 10 2005 005 771 | 8/2006 |
| WO | 00/74888 | 12/2000 |

OTHER PUBLICATIONS

Zeng Min et al., "Modeling for GMAW process with a current waveform control method", Journal of Materials Processing Technology. Elsevier. NL, vol. 240, DOI: 10.1016/J.JMATPROTEC.2016.10.018, ISSN: 0924-0136. XP029809803, Oct. 22, 2016, pp. 404-413.

(Continued)

*Primary Examiner* — Steven L Yeninas
(74) *Attorney, Agent, or Firm* — GREENBLUM & BERNSTEIN, P.L.C.

(57) ABSTRACT

In order to improve the estimation of the arc voltage for use in a welding process, a welding line is modeled using a welding line model in the form of a transfer system with an order greater than one for estimating the arc voltage, and the estimated value of the arc voltage is determined as the difference between the measurement voltage at the measurement point and the determined line voltage drop.

11 Claims, 4 Drawing Sheets

(56) References Cited

U.S. PATENT DOCUMENTS

Figure 1:
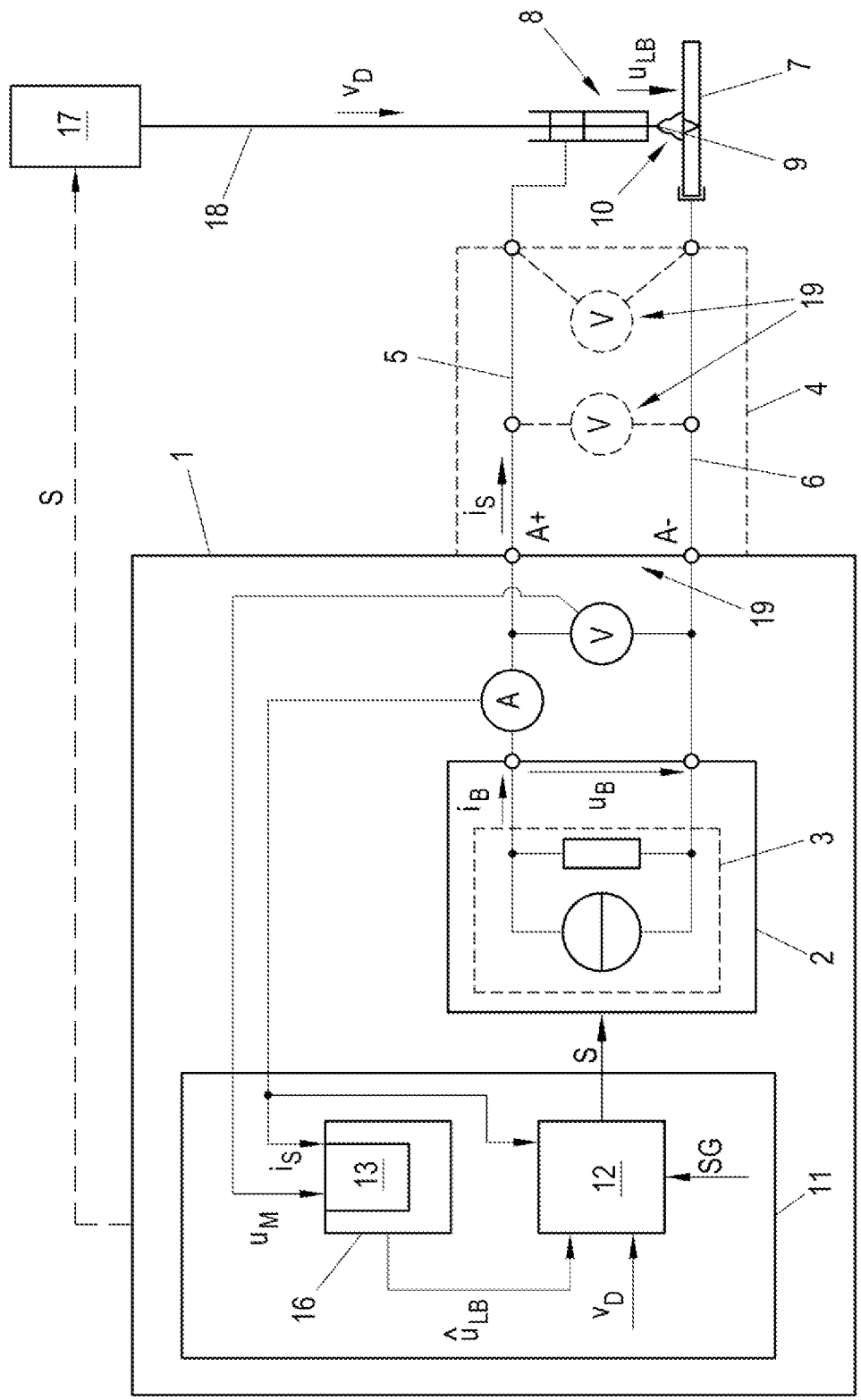

| | | | | |
|---|---|---|---|---|
| 2007/0085518 A1* | 4/2007 | Buda | ............... | B23K 11/257 |
| | | | | 323/281 |
| 2010/0308027 A1* | 12/2010 | Vogel | ............... | B23K 9/0953 |
| | | | | 219/130.21 |
| 2012/0061362 A1* | 3/2012 | Davidson | ............ | B23K 9/0953 |
| | | | | 219/130.31 |

OTHER PUBLICATIONS

Uwe Reisgen et al., "Virtual welding equipment for simulation of GMAW processes with integration of power source regulation", Frontiers of Materials Science ; Selected Pubucations From Chinese Universities, SP Higher Education Press, Heidelberg, vol. 5, No. 2, DOI: 10.1007/S11706-011-0132-6, ISSN: 2095-0268, XP019912266, Jun. 5, 2011, pp. 79-89.

Europe Search Report and Office Action conducted in counterpart Europe Appln. No 20209769.7 (May 7, 2021).

Int'l Search Report (Form PCT/ISA/210) conducted in Int'l Appln. No. PCT/EP2021/082632 (Mar. 1, 2022).

Int'l Written Report (Form PCT/ISA/237) conducted in Int'l Appln. No. PCT/EP2021/082632 (Mar. 1, 2022).

\* cited by examiner

METHOD FOR DETERMINING AN ESTIMATED VALUE OF AN ARC VOLTAGE

The present invention relates to a method for determining an estimated value of an arc voltage of an arc burning between a welding electrode and a workpiece, wherein a line voltage drop of a welding line between a measurement point on the welding line and the arc is determined with a welding line model with model parameters, and the welding line model models the welding line as a transfer system with a welding current flowing via the welding line or a measurement voltage present at the measurement point as an input variable and the line voltage drop as an output variable, in order to determine a current estimated value for the line voltage drop for a current welding current or a current measurement voltage, and the estimated value of the arc voltage is determined with a known relationship between line voltage drop and arc voltage. The invention also relates to a welding current source in which such a welding line model is implemented.

The main task of a welding current source for performing a welding process is to generate, regulate and control the process variables welding current and/or welding voltage and possibly also welding wire feed as a function of the welding task in such a way that ultimately a good welding result with desired weld seam quality, and thus a good welded connection, is produced. The control of the welding current plays a special role here, because it provides the power for the welding process. For the control of the welding process, the arc voltage is also required, because it is an important parameter for the welding process. The arc voltage drop across the arc is related to the arc length and thus also to the distance between the welding electrode and the workpiece (or weld pool). However, the arc voltage cannot be measured directly in practice, so one must rely on reconstructing the arc voltage from an indirect measurement.

The welding line, consisting of the welding current line (the line leading from the welding current source to the welding torch or the welding electrode) and the ground line (the line returning from the workpiece to the welding current source), connects the welding current source to the welding torch, that is to say to the welding electrode, and to the workpiece. The welding line is typically connected to connection sockets on the welding current source. The socket voltage between the connection sockets, i.e. between the welding current line and the ground line, and the socket current flowing via the welding line, can be easily measured at the welding current source. The socket current can be equated with the welding current, since current flows parallel to the arc can usually be neglected during welding. But due to the voltage drop across the welding line, the socket voltage does not correspond to the arc voltage. For the reconstruction of the arc voltage from the socket voltage, a line model is used in the known prior art, which models the welding line as a series circuit of a line resistor and a line inductance (R/L model) in order to determine the voltage drop at the welding line. An estimated value for the arc voltage can then be determined with the measured socket voltage and the measured socket current and the line model. With the line model, the voltage drop across the welding line is thus compensated in order to obtain an estimated value of the arc voltages. This is known, for example, from WO 2000/74888 A1 or DE 10 2005 005 771 B4. Since in this model the hosepack is described with only one energy storage or dynamic component (the line inductance L), this model has the order one.

The parameters of the R/L line model, i.e. line resistance and line inductance, are either known or are identified. Parameter identification can take place during welding or also during a welding pause. For example, the welding electrode (or the contact tube of the welding torch) can be short-circuited with the workpiece. The line resistance is then determined at constant current. Then a current pulse can be applied and the line inductance can be determined therefrom. During welding, for example, a current pulse which does not interfere with the welding process can be modulated onto the welding current and the model parameters can be determined from the reaction. The model parameters can also be determined continuously via a formula from existing measured values, such as in DE 10 2005 005 771 B4.

The arc voltage can thus be estimated during operation of the welding current source. However, it has been found in practice that considerable estimation errors can occur with the usual R/L line model in the reconstruction of the arc voltage, which can negatively influence the welding process.

Through research by the applicant, it was recognized that the routing of the welding line has a major impact on the reconstruction of the arc voltage. It was observed that the welding line is often routed in the vicinity of electrically conductive parts/components/structures. This can be a robot arm of a welding robot, or a steel structure on a construction site or in a workshop, or a metallic component (such as for example in shipbuilding), or the steel reinforcement in a reinforced concrete part, or also a metallic cable duct, or the like. Due to the highly dynamic welding currents (temporally changing electrical currents with steep edges and high frequencies) flowing through the welding line, an electromagnetic interaction with such components can occur. The temporally changing welding currents cause temporally changing magnetic fields in the surroundings of the welding line. As is known, an electrical field strength is induced in an electrically conductive body which is located in a changing magnetic field, which electrical field strength leads directly to the generation of electrical current densities in the body due to the conductivity. The current densities are generated such that their magnetic fields are in turn directed against the original field, which subsequently leads to an interaction of the current-conducting components. The temporally changing welding current in the welding line causes such phenomena in adjacent electrically conductive materials. A conventional R/L line model cannot describe such couplings and, in such cases, therefore does not provide sufficient accurate reconstruction of the arc voltage.

This effect occurs particularly strongly in ferromagnetic materials, such as iron or steel, since the magnetic flux density in such materials can be high. However, this effect can also be observed in paramagnetic materials, such as aluminum, but weaker than in ferromagnetic materials.

Since welding lines must always be routed in the vicinity of such electrically conductive materials during practical application—because they have to be welded—this effect has virtually always an influence on the performance of the welding process. This effect cannot be detected by the currently used R/L line model from a line resistance and a line inductance connected in series, as a result of which the reconstruction of the arc voltage can be imprecise, which in turn can adversely affect the achievable welding quality.

The arc voltage is not only an important variable for controlling the welding process, but is also required to determine important known characteristic values of the welding process, for example the heat input into the workpiece to be welded or the energy per unit length (also referred to as arc energy). This also requires estimates of the arc voltage that are as accurate as possible.

It is an object of the present invention to improve the estimation of the arc voltage for use in a welding process.

This object is achieved in that the welding line for estimating the arc voltage is modeled with a welding line model in the form of a transfer system with an order greater than one, and the estimated value of the arc voltage is determined as the difference between the measurement voltage at the measurement point and the determined line voltage drop. It has been recognized that with a welding line model with an order greater than one, the magnetic coupling of the welding line with conductive components in the surroundings of the welding line can also be taken into account when estimating the line voltage drop. Thus, the estimation of the arc voltage also takes the routing of the welding line into account, and the estimation of the arc voltage is more precise than previously. The estimated arc voltage can be used for the control of the welding process, for example the control of a welding current or a wire feed speed of a welding wire. Due to the more accurate estimation of the arc voltage, the achievable quality of the weld seam can also be improved because a more accurate estimation of the arc voltage can be made available to the control. However, the estimation of the arc voltage can also be used for determining characteristic values of the welding process, such as an energy per unit length, a resistance value, a power value or a heat input. Such characteristic values can also be determined more precisely by the more accurate estimation of the arc voltage.

If the model parameters of the welding line model are not known, then they can be identified by means of a parameter estimation method. Parameter estimation methods are known in many ways and can be used easily, so that the model parameters can be easily determined.

The identification of the model parameters can also take place during a short-circuit phase during welding, which makes it possible to continuously re-determine the model parameters in certain welding methods. It is thus possible to respond to changing conditions in the routing of the welding line. However, the model parameters can also be identified for a predetermined time profile of the input variable and associated output variables before welding. This makes it possible to choose a profile of the input variables that is favorable for parameter identification, which can improve the parameter identification.

It has been found to be particularly advantageous if a time profile of the input variable which has a plurality of rising edges is used, wherein the slope of at least two edges varies, and the output variable is measured in the process. The transfer system in the form of the welding line can thus be excited well in order to obtain good measured values and estimates of the output variable for the parameter estimation.

The present invention is described in greater detail below with reference to FIGS. 1 to 5, which show schematic and non-limiting advantageous embodiments of the invention by way of example.

Figure 2:
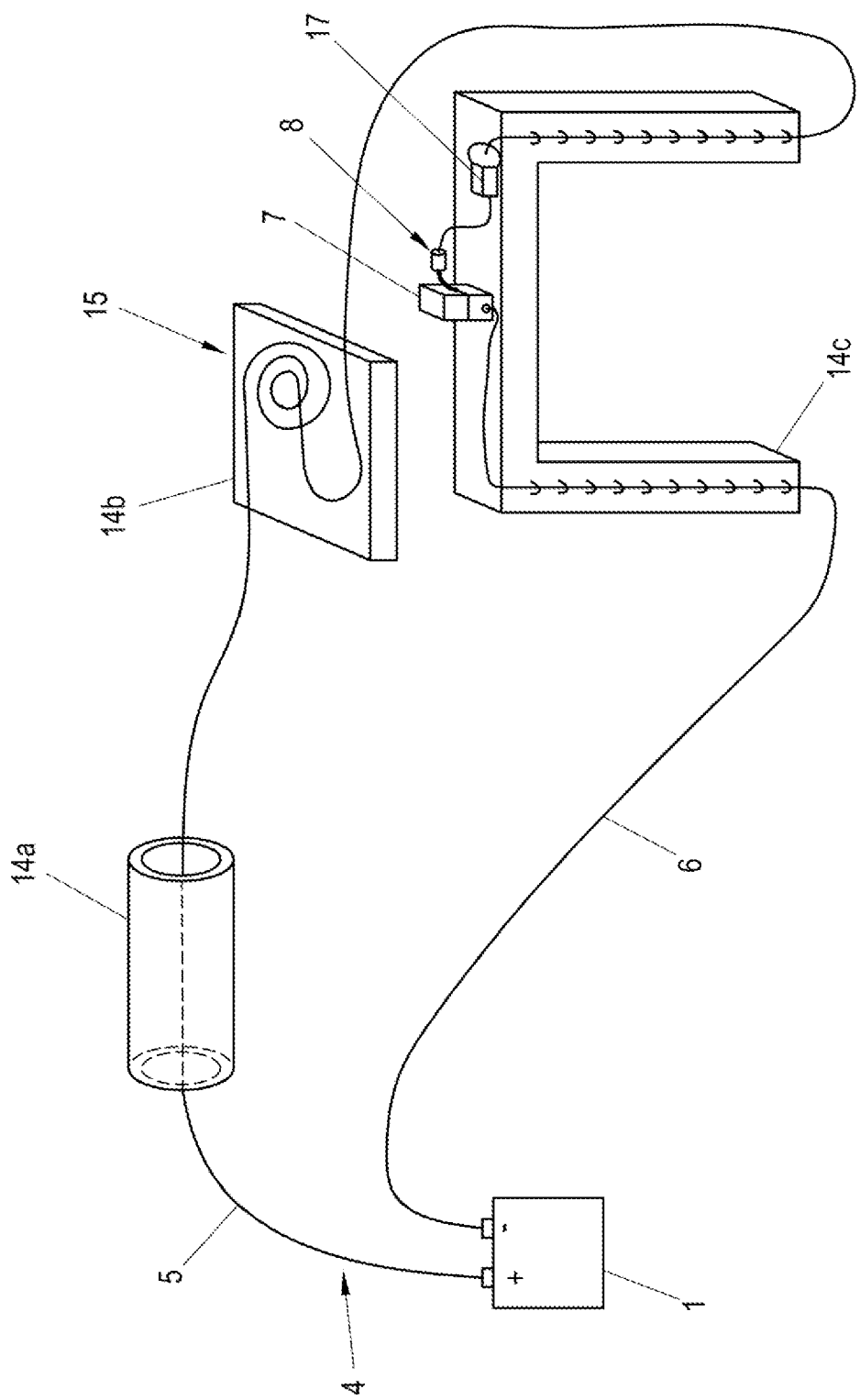
Figure 3:
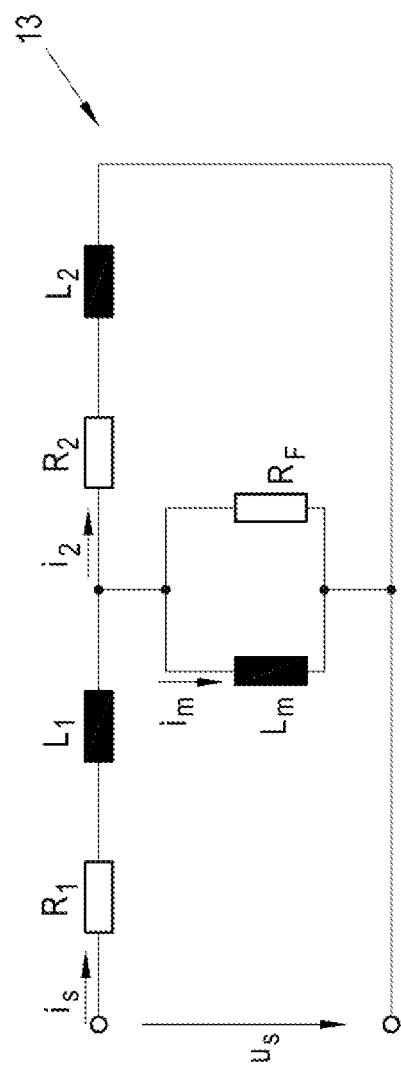
Figure 4:
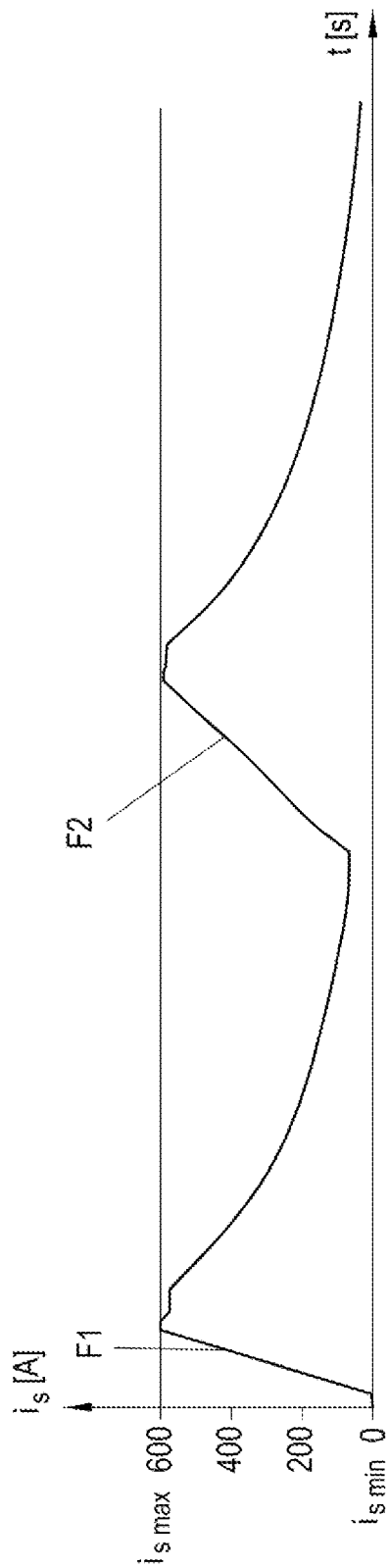
Figure 5:
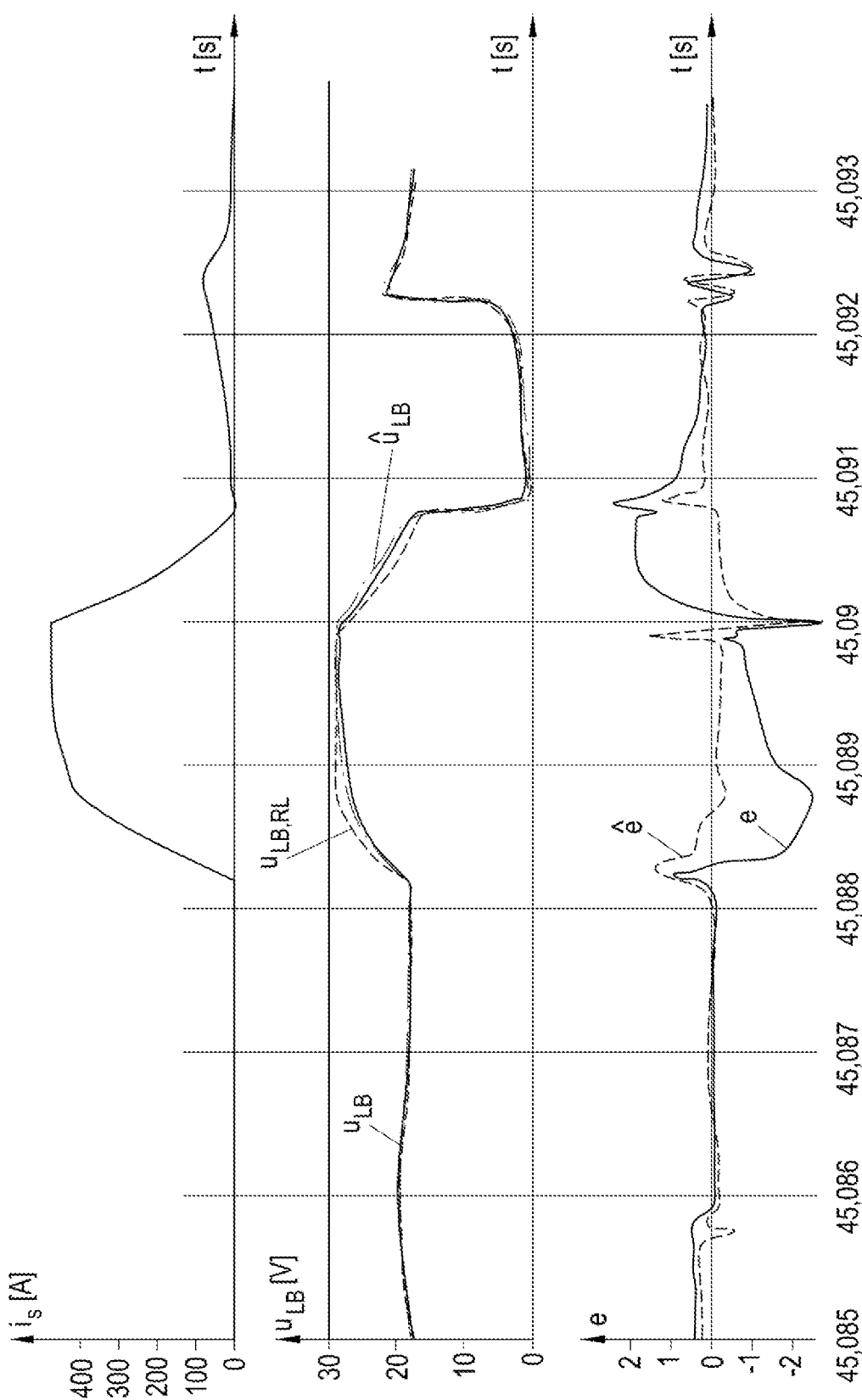

The following are shown:

FIG. 1 shows a welding current source for controlling a welding process,

FIG. 2 shows a routing of the welding line in the vicinity of a conductive component, FIG. 3 shows a welding line model with an order greater than one, FIG. 4 shows the time profile of the welding current as excitation for parameter identification of the model parameters of the welding line model, and FIG. 5 shows the time profile of the arc voltage at a specific welding current with a line model according to the invention with an order greater than one and with a conventional R/L line model.

FIG. 1 describes a welding current source 1 for performing a welding process. The welding current source 1 comprises a power unit 2 for generating the welding current. The power unit 2 is shown as a current source 3, which provides a socket voltage $u_B$ and a socket current $i_B$ at the connection sockets A+, A− of the welding current source 1 for performing the desired welding process. The power unit 2 is an electrical circuit which converts an input voltage, for example from an AC grid (also multi-phase) or from a DC voltage (for example from a battery) into a temporal current profile (the welding current), and is designed for example as a voltage converter such as an AC/DC converter or DC/DC converter. The current profile depends on the welding method and is controlled by a welding control unit 11. The welding control unit 11 can be integrated in the welding current source 1, but can also be implemented separately from the power unit 2 or the welding current source 1. The desired current profile is used for the welding control unit 11 as a setpoint variable SG in order to control the power unit 2 for implementing the welding process. Analogously, a voltage profile could of course also be specified as the setpoint variable SG. A welding line 4 is connected to the connection sockets A+, A− of the welding current source 1, comprising a welding current line 5 and a ground line 6. Usually, but not necessarily, the ground line 6 is routed separately to the workpiece 7 and connected to the workpiece 7 to be welded.

The welding current line 5 is usually guided in a hosepack to a welding torch 8 with a welding electrode 9 (consumable or non-consumable). As is known, further lines can also be integrated in the hosepack, such as, for example, a cooling medium line, a protective gas line, a line for a consumable welding electrode, a control line, etc. The ground line 6 can also be guided in the hosepack.

The welding torch 8 can be arranged on a welding robot (not shown) or can be guided manually. The welding torch 8 can have a contact tube which is connected to the welding current line 5 and is contacted by the welding wire 18, which in this case functions simultaneously as a welding electrode 9 (indicated in FIG. 1), such as for example in metal inert gas (MIG) welding or metal-active gas (MAG) welding. However, a non-consumable welding electrode 9, which is connected to the welding current line 5, such as, for example, in the case of tungsten inert gas (TIG) welding, can also be arranged in the welding torch 8. The filler material is supplied via a welding wire 18. The welding wire 18 can be supplied to the welding point with a welding wire feed unit 17.

During welding, an arc 10 burns between the welding electrode 9 and the workpiece 7. The arc voltage $u_{LB}$ drops at the arc 10. However, the design of the welding torch 8 and the welding method are irrelevant for the invention. To control the welding process, it is important to know the welding current (which can be equated with sufficient accuracy to the socket current $i_B$), i.e. the current flowing across the arc 10, and the arc voltage $u_{LB}$, i.e. the voltage dropping across the arc 10. While the socket current $i_B$ can be easily measured with appropriate measurement technology in the welding current source 1, the arc voltage $u_{LB}$ is not accessible to direct measurement.

To control the welding process, the power unit 2 of the welding power source 1 is controlled by a welding control unit 11, which generates a manipulated variable S for the power unit 2, for example a duty cycle of a PWM (pulse width modulation) control of a current converter, to generate the desired welding current and/or the desired welding voltage. For this purpose, a welding process control unit 12 can be provided in the welding control unit 11, which executes, monitors, and controls the intended welding process. For this purpose, the welding process control unit 12 is given setpoint variables SG of the control, for example a temporal setpoint profile of the welding current or of a welding voltage. A setpoint variable SG can be specified, for example, by settings of the welding process, for example by selecting a welding program or by adjusting welding parameters at an I/O interface of the welding current source 1. The welding control unit 11 and/or the welding process control unit 12 can also receive input variables from the welding process, as actual variables of the control, such as, for example, an arc voltage $u_{LB}$, an actual socket current $i_{B,ist}$ (as welding current) or a welding wire feed speed $V_D$.

The manipulated variable S is converted by the power unit 2 into a specific electrical socket current $i_B$ or a socket voltage $u_B$. For this purpose, the welding control unit 11 can comprise a current controller which determines the manipulated variable S according to a predetermined controller law (e.g. a PI controller or PID controller) from a difference of an actual socket current $i_{B,ist}$ and a predetermined target socket current $i_{B,soll}$. However, the manipulated variable S could also be a target socket current $i_{B,soll}$ or a target socket voltage $u_{B,soll}$. In this case, such a current controller would be implemented in the power unit 2. Of course, the type of manipulated variable S depends on the implementation of the power unit 2.

The welding control unit 11 can also control and monitor additional or other components of the welding current source 1 for control of the welding process, for example a welding wire feed unit 17 (indicated by dashed lines in FIG. 1) for feeding a welding wire 18, also as a welding electrode 9, to the welding point at a desired or required welding wire feed speed $V_D$ (also as a time profile), as indicated in FIG. 1. For this purpose, the welding control unit 11 can also determine additional or other manipulated variables S for controlling the welding process.

Required actual variables of the control, such as, for example, a welding current or socket current $i_B$, a socket voltage $u_B$ or a welding wire feed speed $v_D$, can be measured by means of suitable measuring sensors or can also be predetermined, for example due to a welding program to be executed. However, the arc voltage $u_{LB}$ cannot be measured directly with a conventional welding current source 1 and a conventional welding torch 8, but is estimated for reconstruction using a welding line model 13 implemented in an estimating unit 16. The estimated value of the arc voltage $u_{LB}$ is marked with "/\", i.e. $\hat{U}_{LB}$.

All or certain "control units" or "units" may be embodied as microprocessor-based hardware, wherein the functions of these control units or units are implemented as software. A common microprocessor-based hardware can also be used for several functions. However, a control unit or unit may also be implemented on hardware in the form of a field programmable gate array (FPGA), programmable logic device (PLD), or application-specific integrated circuit (ASIC) or other integrated circuit. Here too, a plurality of control units and/or units can be integrated on such hardware. However, a control unit or unit can also be implemented as an analog circuit or analog computer. Of course, any mixtures of these embodiments are also possible.

The welding line model 13 substantially determines the line voltage drop $u_S$ across the welding line 4, for example the welding current line 5 and the ground line 6, and the estimated value of the arc voltage $\hat{u}_{LB}$ therefrom. The line voltage drop $u_S$ is the sum of all voltage drops at the welding line 4 from a measurement point 19 in the welding line 4 to the arc 10 and back again. The corresponding current-conducting parts of the welding torch 8 up to the arc 10 and the workpiece 7 from the arc 10 to the ground line 6 are also comprised therein. A measurement voltage $u_M$ is measured at the measurement point 19 between the welding current line 5 and the ground line 6.

The measurement point 19 can in principle be provided at any point between the connection sockets A+, A− of the welding current source 1 and the welding torch 8. For example, the connection sockets A+, A− can be used as measurement point 19, as shown in FIG. 1. However, the measurement point 19 can be provided at any point in the welding line 4 or at a connection point of the hose package, as indicated in dashed lines in FIG. 1. It is also possible to provide several measurement points 19. A measurement voltage $u_M$ is measured at the measurement point 19 between the welding current line 5 and the ground line 4. In FIG. 1, the socket voltage $u_B$ is measured as the measurement voltage $u_M$. The arc voltage $\hat{u}_{LB}$ can then be determined at any time from the measurement voltage $u_M$ and the line voltage drop $u_S$ determined by means of the welding line model 13, for example as a difference of the measurement voltage $u_M$ and the line voltage drop $u_S$. In this case, a known voltage drop across the length of the free wire electrode can also be taken into account in a known manner. The line voltage drop $u_S$ does not have to be determined specifically as an intermediate step, but it is also possible to directly determine the estimated value of the arc voltage $\hat{u}_{LB}$. The welding line model 13 is intended to simulate the line voltage drop $u_S$ across the welding line 4 between the measurement point 19 and the arc 10.

For this purpose, the welding line model 13 can receive the welding current $i_S$ which, for example, corresponds to the measured actual socket current $i_{B,ist}$, and/or the measurement voltage $u_M$, for example, the actual socket voltage $u_{B,ist}$, as input variables, which can be measured with measurement sensors and made available as analog or digitized measured values, for example, time-continuously or time-discretely.

The welding line model 13 can also be implemented as software on microprocessor-based hardware, which can also be shared with a control unit, or also entirely or partially as hardware in the form of an FPGA, PLD, ASIC or analog circuit.

The welding line 4, the ground line 6 and/or the welding current line 5, can be arranged in the vicinity of a paramagnetic or ferromagnetic and electrically conductive, in brief hereafter only conductive, component 14, as shown in FIG. 2. In FIG. 2, the welding current line 5 is routed, for example, through a conductive component 14a (for example a conductive profile or a robot arm), routed (also in the form of a loop 15) on top of a conductive component 14b (the workpiece 7 to be welded is also conceivable) or routed on a reinforced concrete component 14c. In practice, of course, not all of the routing shown by way of example in FIG. 2 need to occur, and other routing may also occur in the region of a conductive component 14. Loops 15 can also be formed, for example, around conductive components 14 and form coils. An electromagnetic interaction can occur between a conductive component 14 and the welding line 4.

According to the invention, the welding line model 13 is to be used to model not only the line voltage drop $u_S$ caused by the welding line 4 itself, as hitherto by the simple R/L line model, but also the influence of the surroundings of the welding line 4 and also the influence of the routing of the welding line 4. In order to achieve this, it was recognized that a welding line model 13 with an order greater than or equal to two is required.

The welding line model 13 consists of interconnected electrical components, such as resistors, inductances and capacitances, wherein a plurality of energy stores, such as inductances and/or capacitances, are contained. FIG. 3 shows an advantageous welding line model 13. At the input of the circuit of the welding line model 13, the line voltage drop $u_S$ caused by the welding line 4 is applied, and the welding current $i_S$ flows into the line model. The relationship between the line voltage drop $u_S$ and welding current $i_S$ can be described by means of a transfer function G as the quotient of output variable and input variable, wherein the line voltage drop $u_S$ represents the output variable y and the welding current $i_S$ represents the input variable u. However, the welding line model 13 could also be designed such that the measurement voltage $u_M$ serves as the input variable and the line voltage drop $u_S$ serves again as the output variable. The order of the transfer function G, i.e. the highest occurring time derivative in the underlying differential equation, or equivalently the order of the underlying difference equation, determines the order of the welding line model 13. According to the invention, a welding line model 13 is used which describes the relationship between line voltage drop $u_S$ and welding current $i_S$ or measurement voltage $u_M$ by a transfer system with an order greater than or equal to two, which is equivalent to a transfer function G with an order greater than or equal to two. The structure of the welding line model 13, that is to say the way how the electrical components are interconnected, plays only a subordinate role in this case. Due to the higher order than in the conventional R/L line model (with order one), the influences of the surroundings can be sufficiently mapped.

A physical system such as the welding line model 13 can be described by differential equations in the time-continuous domain, or equivalently, difference equations in the time-discrete domain, also as a system of coupled differential equations or difference equations. It is well known from systems theory that a system of 1st order coupled differential equations or difference equations can be transformed into a higher-order differential equation or difference equation and vice versa. For example, a system of n 1st order coupled differential equations can be transformed into an nth order differential equation, and vice versa. The same applies to difference equations. A welding line model 13 with an order greater than or equal to two can thus be described mathematically in various equivalent ways.

With reference to FIG. 3, a welding line model 13 and the mathematical description are explained by way of example. The welding line 4 is modeled with an input-side series circuit composed of an ohmic resistance $R_1$ and a line inductance $L_1$ (as previously by the R/L line model with order one). In addition, the coupling to a conductive component 14 in the surroundings of the welding line 4 is described by a coupling inductance $L_m$. In the model, a resistance $R_F$ can also be provided parallel to the coupling inductance $L_m$ to describe the iron and eddy-current losses. In order to describe a possible electric current flow $i_2$ in the conductive component 14, another branch can be provided with a series circuit consisting of an ohmic resistor $R_2$ and an inductance $L_2$. It can be seen that this welding line model 13 is based on the known transformer equivalent circuit diagram with a short-circuited secondary side.

It would also be possible to model conductive components 14 in a non-linear manner, for example the line inductance $L_1$, to describe a possible magnetic saturation in the conductive component 14. Thus, for example, the line inductance $L_1$ can be a function of the socket current $i_B$, i.e., $L_1(i_B)$. In this case, non-linear system theory can be applied to mathematically describe the welding line model 13.

It should be noted again that the structure of the welding line model 13 is not decisive and accordingly it can be different from that shown in FIG. 3 as long as the welding line model 13 is described by an nth order transfer system with n>1.

The welding line model 13 according to FIG. 3 can be described with application of Kirchhoff's rules by a transfer system with a system of 1st order differential equations as follows:

$$\frac{d}{dt}x(t) = \underbrace{\begin{bmatrix} \frac{-R_1-R_F}{L_1} & \frac{R_F}{L_1} & -\frac{R_F}{L_1} \\ \frac{R_F}{L_m} & -\frac{R_F}{L_m} & \frac{R_F}{L_m} \\ -\frac{R_F}{L_2} & \frac{R_f}{L_2} & \frac{-R_2-R_f}{L_2} \end{bmatrix}}_{A} x(t) + \underbrace{\begin{bmatrix} \frac{1}{L_1} \\ 0 \\ 0 \end{bmatrix}}_{h} u_S(t)$$

$$y(t) = i_S(t)$$

with the state vector $x(t)=[i_S(t)\ i_m(t)\ i_2(t)]^T$ and model parameters $p_M=[R_1, R_2, R_F, L_1, L_2, L_m]$. According to the known rules of linear system theory, the transfer function G(s) follows therefrom as quotient of output variable y (here $i_s$) and input variable u (here $u_s$) to $G(s)=[1\ 0\ 0](sI-A)^{-1}b$, with the unit matrix I and the Laplace operators. Applied to the welding line model 13 according to FIG. 3 with the transfer system described above, the result is the transfer function $$G(s) = \frac{i_S}{u_S} = \frac{b_0 + b_1 s + b_2 s^2}{a_0 + a_1 s + a_2 s^2 + a_3 s^3},$$

i.e. a 3rd order transfer system (n=3). Thus, the output variable y in the form of the welding current $i_S$ is represented as a function of the input variable in the form of the line voltage drop $u_S$. Likewise, the transfer system can also be written with the measurement voltage $u_M$ as the input variable u, instead of the welding current $i_S$. The transfer system (system of differential equations) can of course also be written with the welding current $i_S$ as input variable and the line voltage drop $u_S$ as output variable, which would result in the transfer function $$G(s) = \frac{u_S}{i_S}$$

In the transfer function G, the order is determined by the highest power of the Laplace operators. The coefficients result therefrom for the welding line model 13 according to FIG. 3, for example as $b_0=R_2R_F$, $b_1=(L_mR_2+(L_2+L_m)R_1)$, $b_2=L_2L_m$, $a_0=R_1R_2R_F$, $a_1=(L_mR_1R_2+(L_2+L_m)R_1+(L_1+L_m)R_2)R_F$, $a_2=L_2L_mR_1+L_2(L_1+L_m)R_F+L_1L_m(R_2+R_F)$, $a_3=L_1L_2L_m$.

The coefficients $b_0$, $b_1$, $b_2$, $a_0$, $a_1$, $a_2$, $a_3$ of the transfer function G(s) and the underlying model parameters $p_M$, here for example $R_1$, $R_2$, $R_F$, $L_1$, $L_2$, $L_m$, are either known or must be determined in order to be able to use the welding line model 13 in a welding current source 1. If the model parameters $p_M$ are not known, they can be determined with sufficiently known parameter estimation methods. The coefficients $b_0$, $b_1$, $b_2$, $a_0$, $a_1$, $a_2$, $a_3$ of the transfer function G can be determined and thereform the model parameters $p_M$ can be determined indirectly, or the model parameters $p_M$ can be determined directly.

Although from the transfer function G(s) with known coefficients $b_0$, $b_1$, $b_2$, $a_0$, $a_1$, $a_2$, $a_3$ the sought line voltage drop $u_S$ could be determined in the continuous time domain from the known variables, here e.g. the welding current $i_S$ or the measurement voltage $u_M$, this is complex in practice. To this end, a differential equation would have to be solved, which is often not possible in an analytical way, but must be performed numerically. Due to the associated computing effort, it is often not possible to carry it out online in a sufficiently short time. It is therefore advantageous to sample the time-continuous signals with a sample time T and to set up a sampling system with an equivalent difference equation (instead of a differential equation) that calculates the current value of the output variable from past values of the input and output variable. Such a sampling system is considerably better suited for practical implementation in a welding current source 1.

According to the system theory, a sampling system can be created by sampling $t = k \cdot T_a$ with a sampling time $T_a$, where k describes the respective sampling time point. From the continuous time functions of the welding current $i_S(t)$ and the line voltage drop $u_S(t)$, thus discrete time functions $i_s(k)$ or in other notation $i_{S,k}$ and the line voltage drop $u_S(k)$ or in other notation $u_{S,k}$ result, where k is here short for $k \cdot T_a$. By applying the known z-transformation, a time-discrete transfer function $G_z(z)$ can also be determined as quotient of output variable and input variable. The order n of the time-discrete transfer function $G_z(z)$ is again greater than one, analogous to the time-continuous case. The input variable $u_k$, e.g. the welding current $i_{S,k}$ or the measurement voltage $u_{M,k}$, and the output variable $y_k$, e.g. the line voltage drop $u_{S,k}$, are again included as polynomials with the z operator and coefficients $a_i$, $b_i$. In the transfer function $G_z(z)$ the order n is determined by the highest power of the z operator. With the rules of z-transformation, a difference equation can thus be created which determines the line voltage drop $u_{S,k}$ at the current time point k (written short for $k \cdot T_a$ with sampling time $T_a$) from values of the welding current $i_{S,k}$ (or the measurement voltage $u_{M,k}$) at the current sampling time point k and values of the welding current $i_{S,k-j}$ (or the measurement voltage $u_{M,k-j}$) at past time points $(k-j) \cdot T_a$, and values of the line voltage drop $u_{S,k-j}$ from past time points $(k-j) \cdot T_a$.

Using the example of the welding line model 13 according to FIG. 3, a transfer function is obtained, for example, in general form $$G_z(z) = \frac{u_S(z)}{i_S(z)} = \frac{b_3 + b_2 z + b_1 z^2 + b_0 z^3}{a_3 + a_2 z + a_1 z^2 + a_0 z^3}$$

with order $n > 1$ ($n = 3$). From this transfer function $G_z(z)$, with the rules of z-transformation, a difference equation for the line voltage drop $u_{S,k}$ can be derived at the current time point k, in the general form $$u_{S,k} = \frac{1}{a_0}[b_0 i_{S,k} + b_1 i_{S,k-1} + b_2 i_{S,k-2} + b_3 i_{S,k-3} - a_1 u_{S,k-1} - a_2 u_{S,k-2} - a_3 u_{S,k-3}].$$

Depending on the welding line model 13, certain terms may be eliminated or other or additional terms in the difference equation may be included.

The coefficients $b_0$, $b_1$, $b_2$, $a_0$, $a_1$, $a_2$, $a_3$ of the time-discrete transfer function $G_z(z)$, which of course have different values than in the time-continuous transfer function G(s), are either known or can be determined, for example with sufficiently known parameter estimation methods. However, these coefficients $b_0$, $b_1$, $b_2$, $a_0$, $a_1$, $a_2$, $a_3$ are also related to the model parameters $p_M$ of the welding line model 13, so that the model parameters $p_M$ can be determined from the coefficients.

The difference equation is suitable for online determination of the line voltage drop $u_{S,k}$ at the current time point k. For this purpose, only the past values of the output variable $y_{k-j}$, for example the line voltage drop $u_{S,k-j}$, and the input variable $u_{k-j}$, for example the welding current $i_{S,k-j}$ (or the measurement voltage $u_{M,k-j}$), must be stored at the required time points (k-j) and the current value of the input variable $u_k$, for example the welding current $i_{S,k}$ (or the measurement voltage $u_{M,k}$), must be determined, for example by measuring and sampling the respective variable.

As mentioned above, the coefficients $b_0$, $b_1$, $b_2$, $a_0$, $a_1$, $a_2$, $a_3$ of the transfer function G(s) or $G_z(z)$ can be determined, from which in turn the model parameters $p_M$ of the welding line model 13 can be determined, or the model parameters $p_M$ can be determined directly. The model parameters $p_M$ are thus, for example, $R_1$, $R_2$, $R_F$, $L_1$, $L_2$, $L_m$ in the welding line model 13 according to FIG. 3 or indirectly the coefficients $b_0$, $b_1$, $b_2$, $a_0$, $a_1$, $a_2$, $a_3$ in the transfer function G(s) or $G_z(z)$.

For the identification of the model parameters $p_M$, sufficiently known parameter estimation methods can be used, which are suitable for models with a finite number of model parameters $p_M$, as in the transfer functions G(s) and $G_z(z)$ or the mathematical description of the welding line model 13 according to FIG. 3. Generally speaking, a parameter estimation method is used to determine the model parameters $p_M$ indirectly or directly in such a way that the welding line model 13 matches the system to be identified, in this case the welding line 4, as closely as possible in terms of a specified quality criterion. A plethora of well-known parameter estimation methods exist for this purpose, often using the least squares method or the optimization of a cost function. Both methods are known in principle, and therefore only briefly discussed below.

The parameter estimation methods rely on having N real measurements of the output variable y, here the line voltage drop $u_S$, as a function of the input variables u, here the welding current $i_S$. During the measurement, it is preferably assumed that the welding electrode 9 is short-circuited, i.e. that the arc voltage is $u_{LB} = 0$V. When the welding electrode 9 is short-circuited, the line voltage drop $u_S$ corresponds to the measurement voltage $u_M$ at the measurement point 9, i.e., for example, the socket voltage $u_B$. Thus, a predetermined welding current $i_S$ can be generated by the welding current source 1 as input variable u and the resulting measurement voltage $u_M$, e.g. the socket voltage $u_B$, can be measured as output variable y. In this way, any number $i = 1, \ldots, N$ of measurements with input variable $u_i$ and associated output variable y, can be generated.

Based on these measured values, it is obvious that a welding line model 13 is estimated that provides the line voltage drop $u_S$ between the measurement point 19, where the measurement voltage $u_M$ is measured, and the arc 10.

A parameter estimation method is used to minimize the deviation between the real measured values of the output variable y and the estimate of the output variable ŷ, which depends on the model parameters $p_M$, provided by the welding line model 13 for the present input variables u, in order to determine the optimum model parameters.

In the least squares method, a linear system of equations is set up from the measured values $u_i$, $y_i$, which is then solved to obtain the model parameters $p_M$. For this purpose, the parameters to be determined, either directly the model parameters $p_M$ or the coefficients $b_0$, $b_1$, $b_2$, $a_0$, $a_1$, $a_2$, $a_3$ of a transfer function G(s), $G_z(z)$, are summarized in a parameter vector c. In the case of a transfer function $$G_z(z) = \frac{u_S(z)}{i_S(z)} = \frac{\sum_{m=0}^{n} b_m z^m}{\sum_{m=0}^{n} a_m z^m}$$

with numerator and denominator polynomial, for example, the parameter vector $c^T = [a_{n-1} \ldots a_0 \, b_n \, b_{n-1} \ldots b_0]$ would result, where usually $a_n = 1$ is set and n is the order of the transfer function, wherein certain coefficients can of course also have the value zero. The estimated value of the output variable $\hat{y}_i$ of the i-th measurement is then written as $\hat{y}_i = h_i^T \hat{c}_i$ with the data vector $h_i$ which contains the measured values. The dimension of the data vector $h_i$ follows from the dimension of the parameter vector $c_i$. In general, the data vector can be written as $h_i^T = [-y_{i-1} \ldots -y_{i-N} \, u_i \ldots u_{i-N}]$ and consequently contains N measured values of the output variable $y_{i-N}$ and the associated input variables $u_{i-N}$ and a new input variable $u_i$ for which the estimation of the output variable is sought. The current error $e_i$ results from the deviation between the estimation and the measurement in the form $e_i = y_i - \hat{y}_i$. With available N measurements, an overdetermined linear equation system of the form $\hat{y} = H^T \hat{c}$ is then obtained with the data matrix $H = [h_0 \ldots h_N]$ and the error vector $e = y - H^T \hat{c}$ with $y = [y_0 \ldots y_N]$, $e = [e_0 \ldots e_N]$ and $\hat{c} = [\hat{c}_0 \ldots \hat{c}_N]$. In the least squares method, the square norm of the error e is used, i.e. $\|e\|_2 = \sqrt{e^T e}$, the square of which is minimized, i.e.

$$\min_{\hat{c}} \|e\|_2^2.$$

In this case, the solution can be specified analytically in the form $\hat{c} = (H^T H)^{-1} H^T y$, whereby the parameters in the parameter vector ĉ, which correspond to the coefficients $b_0$, $b_1$, $b_2$, $a_0$, $a_1$, $a_2$, $a_3$ of the transfer function $G_z(z)$ or G(s) (correctly estimates of the coefficients), and thus the underlying model parameters $p_M$ (correctly estimates thereof) can be determined.

In the method of optimizing a cost function J, a cost function is set up as a function of the model parameters $p_M$ (a vector with the individual parameters), which is then minimized. Mathematically, it can be written in the form $$\min_{p_M} J(p_M),$$

wherein, for example, a secondary condition $p_M > 0$ is taken into account if the component values of the welding line model 13 are estimated directly with the model parameters $p_M$. The cost function J can be set up as desired and can also comprise a plurality of cost terms in order to pursue various optimization objectives, wherein the cost terms in the cost function J can also be weighted differently, for example by means of weighting factors. Different cost terms are usually added in the cost function J. In a frequently used implementation, the cost function J is formulated as the sum of the squared deviations between the N real output variables $y_i$ which are measured and set due to the input variables $u_i$ and the estimated values $\hat{y}_i$ estimated with the welding line model 13 for the input variables $u_i$. Mathematically, the cost function J can thus be written as $$J(p_m) = \sum_{i=1}^{N}(y_i - \hat{y}_i)^2.$$

The optimization is then usually solved numerically, for example by a known iterative method, for example the Newton method or gradient method, or an evolutionary method. In optimization, the model parameters $p_M$ are chosen or specified at the start and then iteratively changed according to the rules of the optimization method so that the cost function J converges towards a minimum. Usually, a termination criterion is also defined, so that the optimization is ended when the termination criterion is reached. The model parameters $p_M$ when the termination criterion is reached are used as optimal model parameters.

For example, the model parameters $p_M$ of the welding line model 13 shown in FIG. 3 for a particular routing of a welding line 4 were estimated by optimizing the cost function $$J(p_M) = \sum_{i=1}^{N}(y_i - \hat{y}_i)^2$$

by the following component values $L_M = 28.841$ pH, $L_1 = 16.373$ pH, $L_2 = 67.27$ pH, $R_F = 56$ mΩ, $R_1 = 2.3$ mΩ, $R_2 = 60.9$ mΩ.

In addition, however, there are also a plethora of further methods which can be used for the parameter estimation, including those which can additionally take into account a measurement noise. In general, methods of autoregression can be used which are based on known model structures such as an ARX or ARMAX structure (substantially a system of difference equations of a certain structure), and which can also take measurement noise into account. Such model structures are often solved using maximum likelihood estimation or a least squares method.

Either the values of the components in the welding line model 13 are estimated directly, or the coefficients $b_0$, $b_1$, $b_2$, $a_0$, $a_1$, $a_2$, $a_3$ of the time-continuous transfer function G(s) or time-discrete transfer function $G_z(z)$ are estimated. If the coefficients $b_0$, $b_1$, $b_2$, $a_0$, $a_1$, $a_2$, $a_3$ of the time-continuous transfer function G(s) or the time-discrete transfer function $G_z(z)$ are estimated, the values of the components in the welding line model 13 can be calculated directly from them, as explained above. If the coefficients $b_0$, $b_1$, $b_2$, $a_0$, $a_1$, $a_2$, $a_3$ of the time-discrete transfer function $G_z(z)$ are estimated, then the time-discrete transfer function could be transformed back to the time-continuous domain using the inverse z-transformation, which in turn can be used to determine the values of the components in the welding line model 13.

For parameter estimation, a number i=1 ... N of measured values of input variable u (welding current $i_S$ or measurement voltage $u_M$) and output variable y (line voltage drop $u_S$) are required. The input variable u is to be selected such that as much information as possible can be derived from the output variable y about the system to be identified. During welding, current profiles of the welding current $i_S$ with steeply rising current edges often occur, for example during pulse arc welding or short arc welding methods. The decay behavior of the welding current $i_S$ cannot be directly influenced because the power introduced by the current can only be removed by the ohmic power loss, which is set up by the ohmic losses of the welding line 4 and, in the case of a burning arc, also by the power loss generated by the arc 10. For the parameter estimation, therefore, a time profile of the input variable u (welding current $i_S$ or measurement voltage $u_M$) is preferably generated, which has a plurality of rising edges, for example current edges with a slope $|\Delta i_S/\Delta t|$, wherein the slopes of the individual rising edges are different. Such a time profile of the input variable u in the form of the welding current $i_S$ is shown by way of example in FIG. 4. It can be seen therein that the rising edge F1 of the first rise is steeper than the rising edge F2 of the second rise. Between the temporally successive edges F1, F2, the input variable u, for example the welding current $i_S$, decays.

For the estimation of the model parameters $p_M$ of the welding line model 13 it has been found to be advantageous if the different slopes of the at least two edges F1, F2 are selected in the range between 100 A/ms and 10000 A/ms. Preferably, the slope $|\Delta i_S/\Delta t|$ of a first edge F1 is between 800 A/ms and 1000 A/ms, more preferably 900 A/ms, and the slope $|\Delta i_S/\Delta t|$ of a second edge F2 is between 200 A/ms and 400 A/ms, more preferably 300 A/ms. The absolute value of the slope is given because the welding current $i_S$ for parameter identification can be both positive and negative (DC), or alternating (AC).

The value of the input variable u, for example the welding current $i_S$, is generated between a minimum input value $u_{min}$, for example a minimum welding current $i_{S,min}$, and a maximum input value $u_{max}$, for example a maximum welding current $i_{S,max}$, which can both be configured and which can also be different for different rises. When using the welding current $i_S$ as input value u, the maximum welding current $i_{S,max}$ is preferably selected between 90% to 100% of the welding current is that can be supplied by the welding current source 1. The minimum welding current $i_S$ is preferably selected to be between 0% and 40% of the welding current $i_S$ that can be supplied by the welding current source 1.

However, parameter identification can also be performed in two stages. From the welding line model 13 in FIG. 3, it can be seen that when a pulse of the input variable u, for example the welding current $i_S$, is applied, voltages or currents decay at the inductances $L_1$, $L_2$, $L_m$. If the pulse is applied long enough until these voltages or currents have completely decayed, $L_m$ acts like a short circuit and the ohmic resistance $R_1$ can be determined directly from the input variable u, for example the applied welding current $i_S$, and the output variable y, for example the measured measurement voltage $u_M$ at the measurement point 9, for example the socket voltage $u_B$, for example in the form $R_1 = u_M/i_S$. In this way, the parameter estimation method used to determine the remaining model parameters $p_M$ can be simplified because the resistance $R_1$ is already known.

The pulse is applied until the measurement voltage $u_M$ is constant, i.e. until the voltages at the inductances $L_1$, $L_2$, $L_m$ have decayed. Based on the measured values of the measurement voltage $u_M$, it is easy to determine when the measurement voltage $u_M$ is constant. In the case of the welding current $i_S$, the magnitude of the pulse is preferably selected between 40% and 60% of the welding current $i_S$ that can be supplied by the welding current source 1.

It should be noted that for parameter identification, the sequence in which the edges F1, F2 and optionally the pulse for the estimation of the resistance $R_1$ is applied is irrelevant and can be selected as desired.

The time profile (also time-discrete) of the input variable u, for example the welding current $i_S$, selected for parameter estimation is specified, for example, to the welding process control unit 12 as a setpoint variable SG. With this specified input variable u, the associated output variables y, for example in the form of the line voltage drop $u_S$ with short-circuited welding electrode 9 are measured, preferably time-discretely at specific sampling points $T_a$, in order to obtain the number i=1, ..., N of measured values. The choice of the time profile of the input variable u influences the quality of the parameter identification and is therefore advantageously made in a problem-matched manner.

With the known model parameters $p_M$ of the welding line model 13, for example after the identification of the model parameters $p_M$, as described above, said model can be used in the welding current source 1 in order to determine an estimated value for the arc voltage $\hat{u}_{LB}$ from measured variables of the input variable u, for example the current welding current $i_{S,ist}$ (which corresponds to the measured socket current $i_{B,ist}$) or the current measurement voltage $u_{M,ist}$ at the measurement point 19 (for example the current socket voltage $u_{B,ist}$). This estimated value $\hat{u}_{LB}$ results from a known relationship between the measurement voltage $u_{M,ist}$, which is measured, and the line voltage drop $u_S$ obtained from the welding line model 13, optionally taking into account a known voltage drop on the free wire electrode. The relationship is, for example, simply the difference from the measurement voltage $u_{M,ist}$ and the determined line voltage drop $u_S$.

The determination of the model parameters $p_M$ of the welding line model 13 can take place once before the start of the weld. For this purpose, the welding electrode 9 is short-circuited via the workpiece 7 and the specified or configured time profile of the input variable u (welding current $i_S$) for identification of the model parameters $p_M$ is generated. In doing so, the measurement voltage $u_M$ is measured at the measurement point 19, which in the event of a short circuit corresponds to the line voltage drop $u_S$. From this, the model parameters $p_M$ can be determined, as explained above.

There are welding processes in which short-circuit phases are regularly provided, for example the so-called CMT (cold metal transfer) welding process or short arc welding process. In this case, the consumable welding electrode is moved in the direction of the workpiece 7 until a short circuit forms upon contact with the weld pool. Thereafter, the welding electrode is moved back in the opposite direction. Before a short circuit occurs, during an arc phase, a droplet of the welding electrode is melted and, in the subsequent short-circuit phase, this droplet is discharged into the weld pool. Arc phase and short-circuit phase alternate cyclically.

Such short-circuit phases can also be used to continuously update the welding line model 13 during welding, for example by re-determining the model parameters $p_M$ during a short-circuit phase as described above.

The repeated re-determination of the model parameters $p_M$ can be useful in order to adapt the welding line model 13 continuously to the current conditions during welding, for example when the welding torch 8 is guided by a welding robot and the welding line 4, the ground line 6 and/or the welding current line 5, is arranged at least partially on the welding robot. The movement of the joints of the welding robot can result in changing magnetic interactions between the welding line 4 and the welding robot (conductive component 14), which can be taken into account in this way. As a result of the movement of the welding robot, however, the position of the welding line 4 relative to a conductive component 14 can also change, which can likewise lead to a changing interaction. Of course, the same can also arise during manual welding.

FIG. 5 shows, by way of example, a time profile over time t of an arc voltage $u_{LB}$ measured for comparison, which results from a current pulse with a steeply rising current edge of the welding current $i_S$ (top in FIG. 5) with a conductive component 14 in the vicinity of the welding line 4. Dashed lines show the arc voltage $u_{LB,RL}$ estimated with the previously used simple R/L line model. The arc voltage $\hat{u}_{LB}$ determined with the welding line model 13 with order n>1 (specifically 3rd order as described above for FIG. 3) according to the invention is shown with a dash-dotted line, which follows the measured arc voltage $u_{LB}$ with less deviation. The smaller deviation between the two profiles can be seen. For clarification, FIG. 5 bottom shows the respective error e between the estimated arc voltage, one time $u_{LB,RL}$ with the R/L line model and the other time the arc voltage $\hat{u}_{LB}$ determined according to the invention, and the measured arc voltage ups. The error ê resulting with the arc voltage kg determined according to the invention is smaller than the error e resulting with the arc voltage $u_{LB,RL}$ determined with the previous R/L line model. It can be seen from this that the previous R/L line model, especially in highly dynamic welding processes (steep current edges), is less suitable than the welding line model 13 with order n>1 according to the invention. It can be seen that the arc voltage $u_{LB}$ is much better approximated with such a welding line model 13. The estimation of the arc voltage $\hat{u}_{LB}$ could possibly be further improved with a nonlinear modeling of the inductance $L_1$ in the welding line model 13, for example as a function of the welding current $i_S$, i.e. $L_1(i_S)$.

As mentioned, parameter estimation estimates the values of the model parameters $p_M$. If this is repeated regularly and the temporal development of at least one model parameter $p_M$ is recorded, then the temporal development of the value of this at least one model parameter $p_M$ can also be used to draw conclusions about the condition of the welding line. For example, if the at least one model parameter $p_M$ changes too much in successive estimates (corresponding limits can be configured), then damage in the welding line can also be inferred and a corresponding output could be provided at the welding power source 1, such as a visual indication and/or an audible warning signal.

The, or at least one model parameter $p_M$ can also be used to obtain conclusions about the routing of the welding line 4. If a model parameter $p_M$, which determines the coupling with the conductive component 14, for example a coupling inductance $L_m$ as in the welding line model 13 according to FIG. 3, becomes too large (which may be specified or configured by appropriate limits), then an indication could be output, for example acoustically or visually, that the position of the welding line 4 should be checked.

As mentioned, a plurality of measurement points 19 can also be provided. This makes it possible to determine a welding line model 13 for each of the different measurement points 19 by estimating the model parameters $p_M$ for measured values at each of the different measurement points 19. This allows at least two different estimates of the arc voltage $\hat{u}_{LB}$ to be determined. This allows, for example, one estimate to be checked for plausibility by the other, in that the estimate is considered valid if the two estimates do not deviate too far from each other (wherein appropriate limits may be configured or specified). However, at least two different estimates of the arc voltage $\hat{u}_{LB}$ can also be used to determine an average value, which is then used as the estimate of the arc voltage $\hat{u}_{LB}$. However, the various estimates of the arc voltage $\hat{u}_{LB}$ could be used to locally isolate a fault in the welding line 4. If several estimates of the arc voltage $\hat{u}_{LB}$ from a certain measurement point 19 (i.e. in the direction of the welding torch 9) yield essentially identical estimates of the arc voltage $\hat{u}_{LB}$, but differ from estimates before this certain measurement point 19, then this may be an indication of damage in welding line 4 before this certain measurement point 19.

An estimated arc voltage $\hat{u}_{LB}$ can serve to control a welding process implemented with the welding current source 1, as explained above with respect to FIG. 1. However, an estimated arc voltage $\hat{u}_{LB}$ can also be used to determine other characteristic values that are important for a welding process. For example, the arc voltage $\hat{u}_{LB}$, and possibly other process variables such as the welding current $i_S$, can be used to determine characteristic values of the welding process, for example the heat input into the workpiece 7 to be welded and/or the energy per unit length (also called arc energy). The energy per unit length, for example, is a measure of the energy supplied to the welding process. The heat input and/or the energy per unit length can be documented for the welding as a documentation value for quality assurance and for subsequent tracking of faults. Other characteristic values of the welding process that can be determined from the estimated arc voltage $\hat{u}_{LB}$ and stored as documentation values are a resistance value across the weld or a power value. A documentation value can be stored at the welding current source or at another location, or it can be output in real time (or periodically synchronized with the welding process) via an interface (analog or digital).

The invention claimed is:

1. A method for determining an estimated value of an arc voltage of an arc burning between a welding electrode and a workpiece, the method comprising:
    determining a line voltage drop of a welding line between a measurement point on the welding line and the arc using a welding line model with model parameters, wherein the welding line model models the welding line as a transfer system with a welding current flowing via the welding line or a measurement voltage present at the measurement point as an input variable and the line voltage drop as an output variable, in order to determine a current estimated value for the line voltage drop for a current welding current or a current measurement voltage, and
    determining an estimated value of the arc voltage using a known relationship between the line voltage drop and the arc voltage, wherein for estimating the arc voltage, the welding line is modeled using the welding line model as a transfer system with an order greater than one, and
    wherein the estimated value of the arc voltage is determined as the difference between the measurement voltage at the measurement point and the determined line voltage drop.

2. The method according to claim 1, wherein the transfer system is modeled with a transfer function $G(s)$, $G_z(z)$ as a quotient of the output variable to the input variable.

3. The method according to claim 1, wherein during a short circuit between the welding electrode and the workpiece or a weld pool on the workpiece, associated output variables are measured for a plurality of input variables, and the model parameters are identified based on the plurality of input variables and the associated output variables by a parameter estimation method.

4. The method according to claim 3, wherein the model parameters are identified during a short-circuit phase during welding.

5. The method according to claim 3, wherein the model parameters are identified before the welding for a predetermined time profile of the input variable and the associated output variables.

6. The method according to claim 3, wherein a time profile of the input variable is generated, which has a plurality of rising edges, and wherein the slopes of at least two edges are different.

7. The method according to claim 6, wherein the welding current is used as the input variable and the different slopes of the at least two edges for the time profile of the input variable are selected in a range between 100 A/ms and 10000 A/ms.

8. The method according to claim 3, wherein the parameter estimation method is used to minimize a deviation between measured values of the associated output variables and estimates of the output variables determined using the welding line model for the input variables in order to determine the model parameters of the welding line model.

9. The method according to claim 3, wherein the model parameters are identified several times and the temporal development of a value of at least one of the model parameters is investigated in order to obtain conclusions regarding faults in the welding line or regarding an unfavorable routing of the welding line.

10. The method according to claim 1, wherein a pulse of the welding current is applied to the welding line until a value of the measurement voltage is constant at the measurement point and an ohmic resistance of the welding line model is determined from a quotient of the measurement voltage and the applied welding current.

11. A welding current source for performing a welding process, comprising:

a welding control unit with an estimation unit, wherein a welding line model with model parameters is implemented in the estimation unit, the welding model line describing a relationship between a welding current flowing via a welding line of a welding current source or a measurement voltage applied to a measurement point of the welding line as an input variable and a line voltage drop at the welding line as an output variable in the form of a transfer system, and the welding line model determining a current estimated value for the line voltage drop at a current welding current or at a current measurement voltage, and wherein the welding control unit determines an estimated value of an arc voltage of an arc burning between a welding electrode and a workpiece from a known relationship between the line voltage drop and the arc voltage, wherein the welding line model is modeled in the estimation unit in the form of a transfer system with an order greater than one, and wherein the estimation unit is designed to determine the estimated value of the arc voltage as the difference between the measurement voltage at the measuring point and the determined current estimated value for the line voltage drop.

* * * * *